3,131,130
METHOD OF PRODUCING SOLUBLE COLLAGEN
Irving B. Oneson, Somerville, N.J., assignor to
Ethicon, Inc., a corporation of New Jersey
No Drawing. Filed July 31, 1961, Ser. No. 127,859
8 Claims. (Cl. 195—6)

This invention relates to a process for depolymerizing the collagen fibril, and to the soluble collagen monomers that result from the depolymerization process.

Collagen is an important structural protein and occurs in many tissues of the animal body. Depending on the kind of tissue and the age of the animal, some collagen may be extracted using organic acids in the pH range 2 to 4.5. However, the majority of the collagen, particularly in the older animals, will not be extracted under these conditions and is referred to as acid-insoluble collagen.

The fundamental biochemical unit of collagen is the fibril. Fibrils have diameters ranging roughly from 50 A. to 1000 A. The lengths of the fibrils are indeterminant but are usually at least several hundred times that of the diameters. The fibril is considered to be built-up from a fundamental building block called tropocollagen. Tropocollagen is considered to be a rod-like particle of about 3000 A. in length and 15 A. in width and to have a molecular weight of about 300,000. This fundamental unit may be considered to be a monomer unit and the fibril may be considered to be a polymeric form of this unit.

The monomer units forming the fibril are linked together by several types of forces. Some of these forces are relatively weak such as hydrogen bonds and electrostatic charges. A fibril held together by such forces may be put into solution with cold dilute saline or solutions of organic acids since such solutions may rupture these relatively weak bonds. The result is a solution of the monomer units or of simple aggregates of the monomer units of the fibril and the disappearance of the fibril as an entity.

If the fibril is linked together with stronger forces such as covalent bonds (in addition to the weaker forces discussed above), it will not dissolve in solutions of dilute organic acids and is referred to as acid-insoluble collagen. While such a fibril will swell to several times its diameter by the imbibition of fluid and form viscous dispersions, it will not lose its identity. In contrast to soluble collagen these fibrils even when swollen may be readily centrifuged from a dispersion at moderate speeds (4000 r.p.m.) in the centrifuge and may be readily visualized in the phase contrast microscope.

Tissues such as hide or tendon, especially in adult animals, are composed largely of fibrils held together or cross-linked by the stronger, covalent type of bonds. When such tissues are swelled in dilute organic acids and mechanically finely subdivided, a dispersion of swollen fibrils rather than a solution of collagen is obtained.

It is a feature of the present invention to convert such dispersions to solutions of collagen.

I have discovered that the treatment of the swollen fibrils with certain enzymes results in the formation of soluble collagen.

In the process of the present invention collagenous tissues such as skin or tendons are cleaned mechanically and washed free of dirt and adhering noncollagenous tissues. The tissues are finely divided and extracted successively with 0.1 M disodium phosphate and 10% NaCl to further remove noncollagenous proteins and mucopolysaccharides. After washing out the salt the finely divided tissues are swollen in a dilute organic acid and further dispersed while in the swollen state. The resulting dispersion of fibrils (about 0.1% solids) is strained through a coarse filter such as cheesecloth to remove particles which are only partially swollen by the acid. The purified dispersion of fibrils may now be exposed to enzymic attack or the acid swollen collagen fibrils may be precipitated, collected and reswollen in dilute acid solution to a higher concentration, usually .2 to .3%. The above processes are done in the cold to avoid the possibility of denaturing the collagen.

It is essential that the fibril be in a swollen state prior to enzyme treatment. Acetic acid at a concentration of 0.3% by volume is a convenient dispersing medium giving a final pH of 3.5. Other organic acid swelling agents such as lactic, malonic or cyanoacetic acid may also be used. The pH of the acid swelling solution is in the range of 2 to 4.5. Above pH 4.5 the fibril is no longer in a suitably swollen state. The pH per se of the dispersion is not so important for enzymic action as is the swollen state of the fibrils achieved through the lowered pH. If the fibrils could be swollen sufficiently at neutral or alkaline pH values, it is believed that the depolymerization would still take place.

The temperature at which the enzymic depolymerization occurs is also important. This may range from 0 to 30° C. but preferably it should be at about 25° C. Mammalian collagen fibrils swollen in acid medium undergo a modification at about 33° C. thereby becoming readily attacked by proteolytic enzymes. This attack does not involve a depolymerization of the fibril but it is a proteolysis degrading the collagen to amino acids and peptides. Since the enzymes concerned with depolymerization also have proteolytic activity, the control of temperature becomes of great importance in this process.

The salt concentration of the collagen dispersion also has an effect on the enzymic depolymerization through its effect on the degree of swelling of the fibril. For example, in 2 M NaCl the swelling of the fibril is completely inhibited and no depolymerization takes place even under conditions otherwise suitable for the reaction.

Enzymes suitable for depolymerization of the swollen collagen fibril are the elastases such as pepsin and particularly the sulfhydryl containing enzymes such as papain, bromelain, pinguinain and ficin.

Enzyme concentration may range from .001 to 1%. The speed of the enzymic depolymerization depends on a number of factors including the type of fibrils. In general, fibrils from hide depolymerize more readily than those from tendon and fibrils from young animals depolymerize more readily than those from older animals. The enzyme to substrate ratio also is of some importance. If the ratio of enzyme to substrate (fibril) is sufficiently large, the fibril may be deswollen and the depolymerization actually inhibited.

While the mechanism of the depolymerization of the collagen fibril is not known, it is thought that the acid in swelling the fibril opens it to enzymic penetration and exposes certain sites involved in cross-linking the monomers. It is these cross-links that are believed to prevent the solubilization of the fibril and maintain its integrity. By permitting the enzymes to penetrate the fibril and attack the exposed sites, the collagen fibril may be broken down to its monomer components which are soluble.

It will be understood that the foregoing general description and the following detailed description as well are explanatory and exemplary but do not restrict the invention. The process for the depolymerization of swollen collagen fibrils and the nature of the product obtained will be more fully understood from the following detailed description and examples.

*Example I*

A single flexor tendon from the leg of a steer is mechanically trimmed of fat and fascia, frozen and sliced on the meat slicer. The slices 2.5 g. (wet weight) are extracted overnight with cold 0.1 M $Na_2HPO_4$. The slices are then dispersed in the Waring Blendor using a fresh portion of cold 0.1 M $Na_2HPO_4$ and extracted an additional one hour. The dispersed slices are extracted with fresh cold 10% NaCl once daily for the three days. Finally, the dispersed slices are washed with water and swelled in 1 liter of 0.3% by volume acetic acid in the cold overnight. The swollen slices are dispersed in a Waring Blendor and the swollen, dispersed fibrils are filtered through a single layer of cheesecloth and then a double layer of cheesecloth to remove unswollen material.

The swollen fibrils are precipitated from the acid dispersion by the addition of 5% by weight sodium chloride. The fibrils are collected by centrifugation; neutralized with ammonia and washed free of chloride with water. The purified fibrils are again dispersed in 0.3% acetic acid, the concentration of collagen solids being 0.2%, and 0.0001% by weight of aureomycin is added.

Twenty-five milligrams of crystalline pepsin is added to 248 g. of the above dispersion and the mixture is incubated at 25° C. for 12 days. At the end of this time the fibrils disappear (phase contrast optics) leaving a solution of soluble collagen.

The soluble collagen was dialyzed against cold 1% NaCl for several days and then slowly warmed to room temperature. On warming fibrils precipitated out. The fibrils when examined in the electron microscope showed the characteristic 640 A. spacing of collagen. The yield of the fibrils based on hydroxyproline recovery was 74.7%.

*Example II*

A portion of split steer hide is frozen and sliced in the meat slicer. The slices are treated as in Example I and the purified fibrils are dispersed at a concentration of 0.2% in 0.3% acetic acid containing 0.0001% aureomycin. Fifty-seven mg. of crystalline pepsin is added to 566.5 g. of this dispersion. After six days at 25° C. fibrils can no longer be seen in the microscope (phase contrast). After dialysis against cold 1% NaCl and warming to room temperature collagen fibrils precipitate which showed the typical 640 A. spacing in the electron microscope. The yield of fibrils based on hydroxyproline recovery is 76.5%.

*Example III*

A portion of a split steer hide is frozen and sliced on the meat slicer. The slices are treated as in Example I and the purified fibrils are dispersed at a concentration of 0.3% in 0.3% acetic acid containing 0.0001% aureomycin and 0.01 M cysteine. To 100 mg. of this dispersion is added 10 mg. of a partially purified papain preparation containing 945 azocoll units per mg. After standing at 25° C. for 10 days, no fibrils can be seen in the microscope (phase contrast). Fibrils of soluble collagen are reconstituted by the addition of 5% by weight solid sodium chloride and neutralizing the acid with ammonia. Fibrils are collected by centrifugation, dialyzed against distilled water and freeze-dried. The yield of soluble collagen based on hydroxyproline recovery was 57.2%.

*Example IV*

To 100 mg. of the dispersion of collagen fibrils described in Example III is added 10 mg. of a partially purified preparation of bromelain with an activity of 182 azocoll units per mg. After standing at 25° C. for ten days, fibrils can no longer be seen in the microscope (phase contrast). Fibrils of soluble collagen are reconstituted by the addition of 5% by weight solid sodium chloride and neutralizing the solution with ammonia. Fibrils are collected by centrifugation, dialyzed against distilled water and freeze-dried. The yield of soluble collagen based on hydroxyproline recovery is 56.5%.

*Example V*

To 500 grams of the dispersion described in Example III is added 10 mg. of a partially purified preparation of pinguinain with a density of 2367 azocoll units per mg. After standing at 25° C. for 4 days, no fibrils can be seen in the microscope (phase contrast). To this solution is added 1% by weight solid NaCl and the solution is neutralized with ammonia. A precipitate of collagen fibrils forms upon standing. The fibrils are collected by centrifugation, dialyzed against distilled water and freeze-dried. The yield of soluble collagen based on hydroxyproline recovery is 59.6%.

*Example VI*

A dispersion of collagen fibrils is prepared from the flexor tendons of the legs of steers as described in Example I. In its final form the dispersion in 0.3% acetic acid contains 0.2% collagen fibrils, 0.0001% aureomycin and 0.01 M cysteine. To 30 g. of this dispersion at 25° C. is added 0.30 ml. of an aqueous extract of crude ficin. The ficin extract is prepared by suspending 50 mg. of crude ficin in 5 ml. of water, stirring for ten minutes and then centrifuging. The supernatant liquid is filtered and the clear ficin extract used as described above.

After 10 days, no fibrils can be seen in the microscope (phase contrast). One percent by weight solid NaCl is added. After neutralization and standing at 25° C. overnight, the soluble collagen precipitates in the form of fibrils that are collected by centrifugation, dialyzed against distilled water and freeze-dried. The yield of soluble collagen based on hydroxy-proline recovery was 66.7%.

The reconstituted collagen fibrils obtained from the soluble depolymerized collagen may be dispersed in acid solution and extruded to form collagen strands by the procedure described in U.S. Patent No. 2,919,999. Solutions of depolymerized collagen may also be used as a binding substance in the manufacture of shaped collagen fiber masses as described in the Highberger Patents No. 2,934,446 and No. 2,934,447.

While the invention has been described in detail according to the preferred manner of carrying out the invention, it will be obvious to those skilled in the art, after understanding the invention, that changes and modifications may be made without departing from the spirit or scope of the invention, and it is intended in the appended claims to cover such changes and modifications.

I claim:
1. The method of producing soluble collagen monomers which comprises the steps of:
   Treating finely divided native collagen with a dilute acid solution to swell the collagen fibrils;
   Treating the acid swollen collagen fibrils with an elastase while maintaining the temperature between 0° C. and 30° C. until all of the swollen collagen fibrils dissolve; and,
   Stopping the reaction at that point by removing the acid from solution.
2. The method of claim 1 wherein the acid is removed from solution by dialysis.
3. The method of claim 1 wherein the acid is removed from solution by neutralization.
4. The method of claim 1 wherein the elastase is pepsin.
5. The method of claim 1 wherein the elastase is papain.
6. The method of claim 1 wherein the elastase is bromelain.
7. The method of claim 1 wherein the elastase is pinguinain.
8. The method of claim 1 wherein the elastase is ficin.

References Cited in the file of this patent
UNITED STATES PATENTS
2,973,302     Bloch et al. _____ Feb. 28, 1961

OTHER REFERENCES

Gustavson: "The Chemistry and Reactivity of Collagen," Academic Press Inc., New York, 1956, pages 186, 187 and 260 and 271. (Copy in Div. 63.)